US009467883B2

(12) United States Patent
Shin et al.

(10) Patent No.: US 9,467,883 B2
(45) Date of Patent: Oct. 11, 2016

(54) METHOD, SYSTEM AND APPARATUS FOR CHECKING STATE OF BEACON DEVICE

(71) Applicant: SK PLANET CO., LTD., Gyeonggi-Do (KR)

(72) Inventors: Chul Yong Shin, Seoul (KR); Jae Hyung Huh, Gyeonggi-Do (KR)

(73) Assignee: SK Planet Co., Ltd. (KR)

( * ) Notice: Subject to any disclaimer, the term of this patent is extended or adjusted under 35 U.S.C. 154(b) by 0 days.

(21) Appl. No.: 14/638,356

(22) Filed: Mar. 4, 2015

(65) Prior Publication Data

US 2015/0304866 A1  Oct. 22, 2015

(30) Foreign Application Priority Data

Apr. 22, 2014 (KR) .......................... 10-2014-0047811

(51) Int. Cl.
H04B 7/00 (2006.01)
H04W 24/08 (2009.01)
H04W 4/00 (2009.01)

(52) U.S. Cl.
CPC ............. *H04W 24/08* (2013.01); *H04W 4/008* (2013.01)

(58) Field of Classification Search
CPC ............................ H04W 24/08; H04W 4/008
USPC ........................................................ 455/41.2
See application file for complete search history.

(56) References Cited

U.S. PATENT DOCUMENTS

| | | | |
|---|---|---|---|
| 2012/0020339 A1* | 1/2012 | Lai ........................ | H04W 48/20 370/338 |
| 2014/0201577 A1* | 7/2014 | Ohtake ............... | G06F 11/0709 714/48 |
| 2015/0294084 A1* | 10/2015 | McCauley et al. . | G06F 19/3456 705/2 |

FOREIGN PATENT DOCUMENTS

KR  1020130055501  5/2013

* cited by examiner

*Primary Examiner* — Wesley Kim
*Assistant Examiner* — Raj Chakraborty
(74) *Attorney, Agent, or Firm* — BakerHostetler LLP

(57) ABSTRACT

A method, system and apparatus for checking the state of a beacon device are disclosed. The system for the checking the state of a beacon device includes a beacon device and a service device. The beacon device transmits information about a beacon state to the service device and then receives a response signal from the service device. The service device receives the information about the beacon state from the beacon device, performs an update with the received information about the beacon state in association with a list of beacon devices, searches for the information about the beacon state of the beacon device, and provides the found information about the beacon state to the terminal.

8 Claims, 6 Drawing Sheets

METHOD, SYSTEM AND APPARATUS FOR CHECKING STATE OF BEACON DEVICE

CROSS-REFERENCE TO RELATED APPLICATION

This application claims the benefit of Korean Patent Application No. 10-2014-0047811, filed Apr. 22, 2014, which is hereby incorporated by reference herein in its entirety.

BACKGROUND

1. Technical Field

The present disclosure relates generally to a method, system and apparatus for checking the state of a beacon device and, more particularly, to a method, system and apparatus for checking the state of a beacon device, which are capable of remotely and automatically checking information about the beacon state of a beacon device.

2. Description of the Related Art

With the development of mobile communication networks and the advancement of terminal specifications, mobile communication terminals have become the necessities of people today and are evolving into total entertainment devices, beyond the scope of conventional simple communication devices or information provision devices.

Such mobile communication terminals have not only the function of performing communication via a mobile communication network but also the function of performing short-range wireless communication, such as Near Field Communication (NFC), Bluetooth communication, etc.

However, NFC has a short communication distance, and requires a separate wireless chip for communication. In contrast, Bluetooth communication has a relatively long communication distance, and most terminals have the function of performing Bluetooth communication. Accordingly, various communication services using the function of performing Bluetooth communication have been being developed.

Furthermore, a service scheme for providing various types of information to the mobile communication terminal of a user by means of a beacon using Bluetooth communication is being developed. In this case, the mobile communication terminal is used to receive a corresponding beacon Identifier (ID) from the beacon and then obtain various types of information using the beacon ID.

However, a lot of cost and time are required to manage a beacon device provided externally and separately, and thus there is a need for a scheme for automatically managing information about a beacon state.

SUMMARY

At least one embodiment of the present invention is intended to solve the problem in which a lot of cost and time are required to manage a beacon device provided externally and separately, and is also intended to provide a method, system and apparatus for the checking the state of a beacon device, which are capable of remotely and automatically checking information about the beacon state of a beacon device by transmitting and receiving the information about a beacon state between the beacon device and a server via short-range wireless communication and also managing information about a beacon state via the server.

In accordance with an aspect of the present invention, there is provided a service device, including a service communication unit configured to transmit and receive data required for the checking of a beacon state of a beacon device through communication with at least one terminal and the beacon device; and a service control unit configured to perform control to receive information about the beacon state from the beacon device, to perform an update with the received information about the beacon state in association with a list of beacon devices, and to, when checking of the information about the beacon state of the beacon device is requested by the terminal, search for the information about the beacon state of the beacon device and then provide the found information about the beacon state to the terminal.

The communication unit may be further configured to receive the information about the beacon state from the beacon device based on short-range wireless communication.

The service device may further include a service storage unit configured to store the list of beacon devices and the information about the beacon state of the beacon device.

The information about the beacon state may include one or more of normal operation information, communication state information, operating system (OS) information, upgrade information, and power information.

In accordance with another aspect of the present invention, there is provided a terminal, including a communication unit configured to transmit and receive data required for the checking of the beacon state of a beacon device through communicating with at least one beacon device and a service device; and a control unit configured to perform control to request the service device to check information about the beacon state of the beacon device, to receive the information about the beacon state of the beacon device in response to the request, to check the received information about the beacon state, and to output the checked information about the beacon state onto a screen.

The communication unit may be further configured to receive a beacon signal using Bluetooth Low Energy (BLE).

The control unit may be further configured to perform user authentication, to consult a list of one or more allowed beacon devices after the user authentication, to select a specific beacon device from the consulted list, to set broadcasting information for the selected beacon device, and to activate a communication function through the setting of wireless Internet client information with the service device.

The control unit may be further configured to, in order to check the beacon state of the beacon device, identify at least one of a Universally Unique IDentifier (UUID) of the beacon device, a major adapted to be indicative of a group of beacon devices, and a minor used to identify the beacon device in the group of beacon devices.

In accordance with still another aspect of the present invention, there is provided a system for the checking the beacon state of a beacon device, including a beacon device configured to transmit information about a beacon state to a service device through short-range wireless communication, and to receive a response signal from the service device in response to the reception of the information about a beacon state; and a service device configured to perform control to receive the information about a beacon state from the beacon device, to perform an update with the received information about a beacon state in association with a list of beacon devices, and to, when the checking of the information about the beacon state of the beacon device is requested by at least one terminal, search for the information about the beacon state of the beacon device and then provide the found information about the beacon state to the terminal; and the terminal configured to request the service device to check the information about the beacon state of the beacon device, to receive the information about the beacon state of the beacon device in response to the request, to check the received information about the beacon state, and to output the checked information about the beacon state onto a screen.

In the system for the checking the beacon state of a beacon device, the beacon device may be configured to broadcast identification information unique to each identification device.

In accordance with still another aspect of the present invention, there is provided a method of checking the state of at least one beacon device, including requesting, by a terminal, a service device to check information about the beacon state of at least one beacon device in response to a request from a user; receiving, by the terminal, the information about the beacon state of the beacon device in response to the request; checking, by the terminal, the received information about the beacon state; and outputting, by the terminal, the checked information about the beacon state onto a screen.

In accordance with still another aspect of the present invention, there is provided a method of checking the state of at least one beacon device, including receiving, by a service device, information about a beacon state from at least one beacon device; performing, by the service device, an update with the received information about the beacon state in association with a list of beacon devices; and, when the checking of the information about the beacon state of the beacon device is requested by at least one terminal, searching for, by the service device, the information about the beacon state of the beacon device and then providing, by the service device, the found information about the beacon state to the terminal.

In accordance with still another aspect of the present invention, there is provided a computer-readable storage medium having stored therein computer-readable program instructions that, when executed by a computer, cause the computer to: request a service device to check information about a beacon state of at least one beacon device in response to a request from a user; receive the information about the beacon state of the beacon device in response to the request; check the received information about the beacon state; and output the checked information about the beacon state onto a screen.

In accordance with still another aspect of the present invention, there is provided a computer-readable storage medium having stored therein computer-readable program instructions that, when executed by a computer, cause the computer to: receive information about a beacon state from at least one beacon device, perform an update with the received information about a beacon state in association with a list of beacon devices; and, when checking of the information about a beacon state of the beacon device is requested by at least one terminal, search for the information about the beacon state of the beacon device and then provide the found information about the beacon state to the terminal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
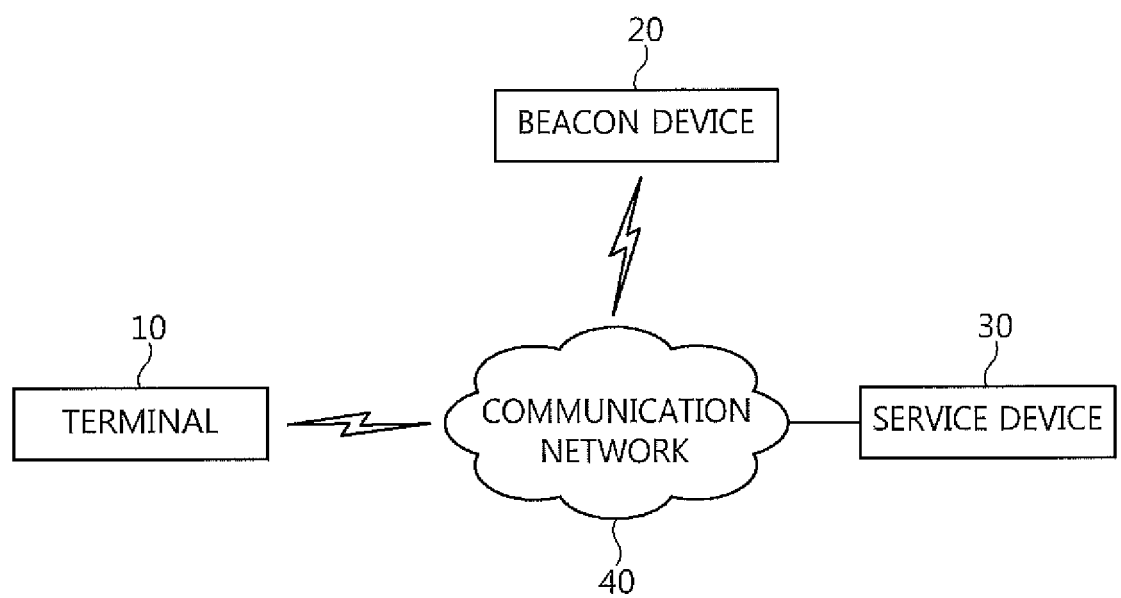
FIG. 1 is a diagram illustrating the configuration of a system for checking the state of a beacon device according to an embodiment of the present invention.

Embodiments of the present invention will be described in detail below with reference to the accompanying drawings. Detailed descriptions of well-known functions and configurations that would make the gist of the present invention obscure will be omitted. Furthermore, it should be noted that the same elements will be designated by the same reference numerals throughout the accompanying drawings as much as possible.

The terms and words that are described below and used in the present specification and the claims should not be interpreted as having common and dictionary meanings, but should be interpreted as having meanings and concepts in accordance with the technical spirit of the present invention based on the principle in which an inventor can appropriately define the concepts of terms in order to describe his or her invention in the most appropriate way. Accordingly, since configurations illustrated in embodiments described herein and the accompanying drawings correspond merely to embodiments of the present invention and do not represent the overall technical spirit of the present invention, it should be understood that various equivalents and modifications that may replace the configurations at the time when the present application is filed.

Embodiments of the present invention will be described in detail below with reference to the accompanying drawings. The following detailed description given below along with the accompanying drawings is intended to describe exemplary embodiments of the present invention, but is not intended to represent the only embodiments in which the present invention can be implemented. The following detailed description includes any specific details to provide the better understanding of the present invention. However, it will be apparent to a person having the common knowledge in the technical field to which the present invention pertains that the present invention may be practiced without those specific details.

In some cases, well-known structures and components may be omitted or illustrated in the form of blocks of block diagrams with a focus on the core functions of the structures and the components in order to avoid making the concept of the present invention obvious.

Throughout the specification, when any part is described as "comprising" or "including" any component, this means that the part does not exclude any other component but includes any other component unless described otherwise. The terms "part," "device" and "module" described in the specification means a unit for processing at least one function or operation, and may be implemented as hardware, software, or combinations of the hardware and the software. Furthermore, "a or an," "one," "the," and similar related terms may be used to mean including singular and plural expressions in the context of the description of the present invention (particularly, in the context of the following claims) unless indicated otherwise or clearly contradicted by the context.

In addition to the above-described terms, the specific terms used in the following description have been provided to aid in the understanding of the present invention. These specific terms may be replaced with other terms without departing from the scope of the technical spirit of the present invention.

Although a terminal according to embodiments of the present invention will be described below by using a mobile communication terminal capable of connecting to a communication network and providing the service of checking the state of a beacon device as a representative example, the terminal is not limited to the mobile communication terminal, but may be applied to various terminals, such as all information communication devices, a multimedia terminal, a wired terminal, a fixed terminal and an Internet Protocol (IP) terminal. Furthermore, when the terminal is a mobile terminal having various mobile communication specifications, such as a mobile phone, a Portable Multimedia Player (PMP), a Mobile Internet Device (MID), a smartphone, a desktop, a tablet PC, a Note book, a net book or a information communication device, the terminal can be utilized advantageously.

Furthermore, beacon technology applied to a mobile communication terminal according to an embodiment of the present invention is data communication technology using Bluetooth Low Energy (BLE). The beacon technology includes a Bluetooth function that acts as a precise GPS. Although NFC can be used within a defined distance of 10 cm, beacon technology can be used to perform measurement within a range from 5 to 49 cm, and thus the range of applications of the beacon technology is significantly broad. The beacon technology does not require that a smartphone is brought into contact with a reader and then tags the reader, unlike NFC, data can be transferred even when the smartphone passes by a place where a beacon has been installed, and the detailed movement of a location can be read within a building and then customized data can be transferred.

A system 100 for checking the state of a beacon device according to an embodiment of the present invention is described below.

FIG. 1 is a diagram illustrating the configuration of the system 100 for checking the state of a beacon device according to this embodiment of the present invention.

Referring to FIG. 1, the system 100 for checking the state of a beacon device according to this embodiment of the present invention includes a terminal 10, a beacon device 20, a service device 30, and a communication network 40.

At least one processor mounted on the terminal 10, the beacon device 20 and the service device 30 according to this embodiment of the present invention may process program instructions for executing a method according to an embodiment of the present invention. In an implementation, the processor may be a single-threaded processor. In another implementation, the processor may be a multi-threaded processor. Furthermore, the processor may process instructions stored in memory or storage.

The communication network 40 performs a series of data transmission and reception operations in order to perform data transmission and information exchange among the terminal 10, the beacon device 20 and the service device 30. In particular, the communication network 40 may include various types of communication networks, for example: wireless communication networks, such as a Wireless Local Area Network (WLAN), a Wi-Fi network, a Wireless Broadband (WiBro) network, a World interoperability for Microwave Access (WiMAX) network and a High-Speed Downlink Packet Access (HSDPA) network; and wired communication networks, such as an Ethernet network, x Digital Subscriber Lines (xDSL) (an Asymmetric Digital Subscriber Line (ADSL) and a Very-high-bit-rate Digital Subscriber Line (VDSL)) network, a Hybrid Fiber Coax (HFC) network, a Fiber-To-The-Curb (FTTC) network and a Fiber-To-The-Home (FTTH) network. Meanwhile, the communication network 40 is not limited to the above-described communication networks, but may include other types of communication networks that have been currently well known or will be developed in the future, in addition to the above-described communication networks.

The terminal 10 communicates with the beacon device 20 and the service device 30 over the communication network 40, and thus transmits and receives data used to check the state of the beacon device 20. In particular, the terminal 10 according to this embodiment of the present invention requests the service device 30 to check the beacon state of the beacon device 20. Thereafter, the terminal 10 receives information about the beacon state of the beacon device 20 in response to the beacon state checking request. Thereafter, the terminal 10 checks the received information about the beacon state, and then outputs the checked information about the beacon state onto a screen.

Furthermore, the terminal 10 receives a beacon signal from the beacon device 20, analyzes the beacon signal, and then extracts beacon identification information. Thereafter, the terminal 10 transmits the extracted beacon identification information to the service device 30. In this case, the terminal 10 may have stored user information. This user information includes at least one of the user name and terminal identification information of the terminal 10. For example, the terminal identification information may include at least one of an International Mobile Station Equipment Identity (IMEI), an Electronic Serial Number (ESN) and a Mobile Identification Number (MDN).

The terminal 10 performs user authentication, and consults a list of allowed beacon devices after the user authentication. Thereafter, the terminal 10 selects a specific beacon device from the consulted list, and then sets broadcasting information for the selected beacon device. Thereafter, the terminal 10 may activate a communication function through the setting of wireless Internet client information with the service device 30.

The beacon device 20 functions to emit a beacon signal via wireless communication in order to enable the terminal 10 to measure a location. More specifically, the beacon device 20 may emit a beacon signal using short-range wireless communication. In an embodiment, the beacon device 20 may emit a beacon signal using BLE. However, the beacon device 20 is not limited thereto, and may emit a beacon signal using Radio-Frequency Identification (RFID), ZigBee, or Near Field Communication (NFC).

The beacon signal emitted by the beacon device 20 includes beacon identification information for the identification of the beacon device 20. The beacon identification information included in the beacon signal may include at least one of the Universally Unique IDentifier (UUID) of the beacon device 20, a major adapted to be indicative of a group of beacon devices, and a minor used to identify a specific beacon device in the group of beacon devices.

Furthermore, the beacon device 20 transmits the information about the beacon state to the service device 30 via the short-range wireless communication. Furthermore, the beacon device 20 receives a response signal from the service device 30 in response to the reception of the information about the beacon state. In this case, since the beacon device 20 is provided with a Wi-Fi module, the beacon device 20 may communicate with the service device 30.

The service device 30 communicates with the terminal 10 and the beacon device 20 over the communication network 40, and thus transmits and receives data used to check the state of the beacon device 20. In particular, the service device 30 according to this embodiment of the present invention receives information about the beacon state from the beacon device 20. In this case, the service device 30 may receive the information about the beacon state through communication with the beacon device 20 via the Wi-Fi module of the beacon device 20.

The service device 30 performs an update with the received information about the beacon state in association with a list of beacon devices. Furthermore, when the service device 30 is requested to check information about the beacon state of the beacon device 20 by the terminal 10, the service device 30 searches for the information about the beacon state of the corresponding beacon device. Thereafter, the service device 30 provides found information about the beacon state to the terminal 10. In this case, the information about the beacon state includes one or more of the normal operation information, communication state information, operating system (OS) information, upgrade information and power information of the beacon device 20.

Accordingly, this embodiment of the present invention may be configured to automatically and remotely check the information about the beacon state in order to determinate whether the beacon device normally operates, thereby checking whether the beacon device normally operates in real time and also reducing the cost and time required for maintenance and management. Furthermore, the location of the terminal is measured using a low-power BLE beacon signal, thereby enabling the terminal to reduce resources required for the measurement of the location thereof and also allowing the service device to simplify logics required for the extraction of information applied to the service thereof.

The service process of checking the state of the above-described beacon device according to the above-described embodiment of the present invention is described in greater detail with reference to FIGS. 2 to 7.

Figure 2:
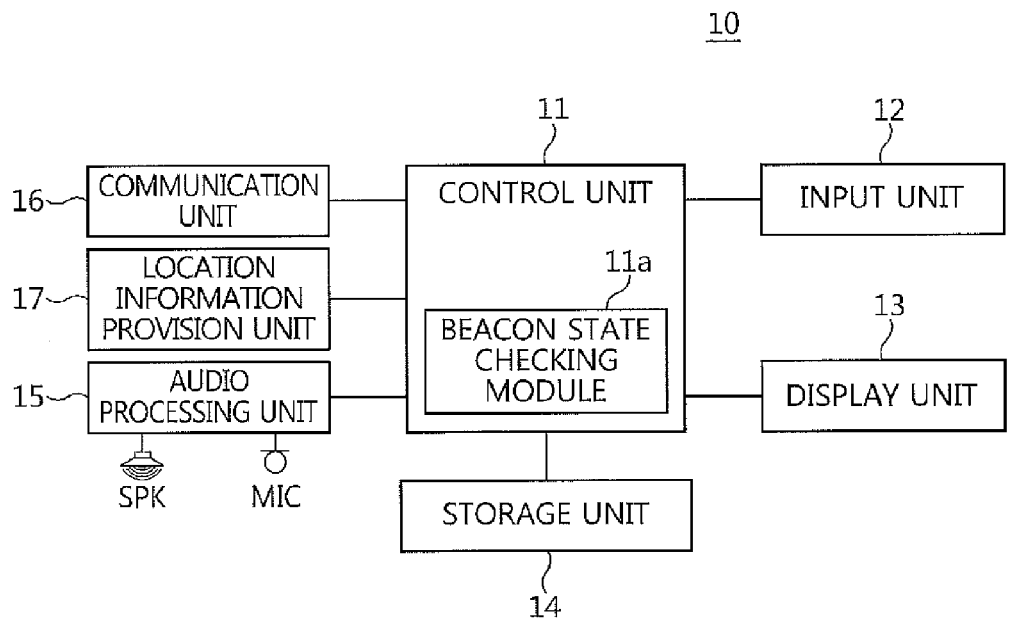
FIG. 2 is a block diagram illustrating the configuration of a terminal according to an embodiment of the present invention.

FIG. 2 is a block diagram illustrating the configuration of a terminal 10 according to an embodiment of the present invention.

Referring to FIG. 2, the terminal 10 according to this embodiment of the present invention includes a control unit 11, an input unit 12, a display unit 13, a storage unit 14, an audio processing unit 15, a communication unit 16, and a location information provision unit 17. In this case, the control unit 11 includes a beacon state checking module 11a.

The input unit 12 receives various types of information, such as number and character information, and transfers input signals related to the setting of various types of functions and the control of the functions of the terminal 10 to the control unit 11. Furthermore, the input unit 12 may be configured to include at least one of a keypad and a touchpad for generating input signals in response to the touch or manual operation of a user. In this case, the input unit 12 may be configured in the form of a single touch panel or touch screen along with the display unit 13, and thus may perform input and display functions at the same time. Furthermore, all types of input means that can be developed in the future, together with input devices, such as a keyboard, a keypad, a mouse and a joy stick, may be used as the input unit 12. In particular, the input unit 12 according to this embodiment of the present invention detects an input signal for user authentication, an input signal for connection to the beacon device 20, an input signal for the checking of the information about the beacon state of the beacon device 20 from an user, and then transfers the detected input signal to the control unit 11.

The display unit 13 displays a series of pieces of information about an operation state, operation results, etc. that are generated during the performance of the functions of the terminal 10. Furthermore, the display unit 13 may display the menu of the terminal 10, user data input by a user, etc. In this case, the display unit 13 may include a Liquid Crystal Display (LCD), a Thin-Film-Transistor Liquid Crystal Display (TFT-LCD), a Light Emitting Diode (LED), an Organic Light-Emitting Diode (OLED), an Active-Matrix Organic Light-Emitting Diode (AMOLED), a retina display, a flexible display, a 3 Dimension display, etc. In this case, when the display unit 13 is configured in the form of a touch screen, the display unit 13 may perform some or all of the functions of the input unit 12. In particular, the display unit 13 according to this embodiment of the present invention outputs a screen for user authentication, a screen for information about the beacon state, etc.

The storage unit 14 is a device for storing data. The storage unit 14 includes a main memory unit and an auxiliary memory unit, and stores application programs required to operate the functions of the terminal 10. This storage unit 14 may basically include a program area and a data area. In this case, when the terminal 10 activates respective functions in response to requests from a user, the terminal 10 executes corresponding application programs under the control of the control unit 11, and then provides the functions. In particular, the storage unit 14 according to this embodiment of the present invention stores an OS for the booting of the terminal 10, a program for user authentication, a program for the checking of the beacon device 20, a program for the checking of information about the beacon state, etc. Furthermore, the storage unit 14 stores user information, beacon identification information, information about the beacon state, etc. In this case, the beacon identification information includes at least one of a UUID, beacon group information, and identification information or a member ID in a beacon group. Meanwhile, the user information includes at least one of a user name and terminal identification information, and the information about the beacon state includes one or more of the normal operation information, communication state information, operating system (OS) information, upgrade information and power information of the beacon device 20.

The audio processing unit 15 functions to transfer an audio signal, input from a speaker (SPK) or a microphone (MIC) for playing and outputting an audio signal, to the control unit 11. This audio processing unit 15 may convert an analog-type audio signal, input via the microphone, into a digital-type signal, and then may transfer the digital-type signal to the control unit 11. Furthermore, the audio processing unit 15 may convert a digital-type audio signal, output from the control unit 11, into an analog-type signal, and then may output the analog-type signal via the speaker. In particular, the audio processing unit 15 according to this embodiment of the present invention outputs an effect sound or a running sound that is generated in the process of providing an enhanced security service.

The communication unit 16 functions to transmit and receive data for enhancing the security of the beacon device 20 over the communication network 40. In this case, the communication unit 16 includes a Radio Frequency (RF) transmission means for up-converting the frequency of a signal to be transmitted and also amplifying the signal, and an RF reception means for performing low-noise amplification on a signal received and also down-converting the frequency of the signal. This communication unit 16 may include at least one of a wireless communication module (not illustrated) and a wired communication module (not illustrated). Furthermore, the wireless communication module is configured to transmit and receive data according to a wireless communication method. The wireless communication module may transmit and receive data to and from the service device 30 using any one of a wireless network communication module, a wireless LAN communication module and a wireless Personal Area Network (PAN) communication module when the terminal 10 uses wireless communication. Furthermore, the wired communication module is configured to transmit and receive data over a wired connection. The wired communication module may be connected to the communication network 40 over a wired connection, and then may transmit and receive data to and from the service device 30. In particular, the communication unit 16 according to this embodiment of the present invention communicates with the beacon device 20 and the service device 30, and then transmits and receives data. In this case, the communication unit 16 receives a beacon signal using BLE.

Under the control of the control unit 11, the location information provision unit 17 receives Global Positioning System (GPS) signals from one or more GPS satellites, determines current location information, such as the latitude and longitude of the terminal 10, and then transmits the location information to the control unit 11. Since an error may occur in the case of using only signals received from the GPS satellites, the location information provision unit 17 may use Round Trip Delay information, pilot phase file information, etc. transmitted from a base station, together with GPS signals, for the purpose of acquiring accurate location information. In this case, the base station performs two roles. One role is to relay the transmission of data between a communication center and the terminal 10, and the other role is to transmit data used to determine the location of the terminal 10, that is, the location of the user. Accordingly, the location information provision unit 17 may determine the location of the corresponding terminal 10 through the reception of the above-described location information, or may determine the current location information of the terminal 10 using trigonometry in which location information is received from three or more base stations and then the precise location of terminal 10 is determined, or the like.

The location information provision unit 17 may measure the location information of the terminal 10 using a BLE method and an NFC tag method. That is, the location information provision unit 17 may determine the location of a user indoors using an Indoor Positioning System (IPS), and may determine minute changes in the location of the user in a building using the IPS. Since this IPS is easily applied to most offline stores and real life, the range of application thereof is very extensive. In particular, the location of the user may be determined within a range from 5 to 49 cm using a data communication technology utilizing BLE that belongs to IPS service. Furthermore, the location information provision unit 17 may check location information using an NFC method. The NFC method is one of wireless tag RFID technologies, and is a contactless communication method using a frequency band of 13.56 MHz. Since the NFC method has a short communication distance, it is a short-range communication method having relatively excellent security.

The control unit 11 may be a process device that operates an OS and individual components. In particular, the control unit 11 according to this embodiment of the present invention requests the service device 30 to check information about the state of the beacon device 20. Thereafter, the control unit 11 receives the information about the beacon state of the beacon device 20 in response to the request. Thereafter, the control unit 11 checks the received information about the beacon state, and then outputs the checked information about the beacon state onto the screen.

Furthermore, the control unit 11 performs user authentication, consults a list of one or more allowed beacon devices after the user authentication, and then selects a specific beacon device from the consulted list. Thereafter, the control unit 11 may set broadcasting information for the selected beacon device, and may activate a communication function through the setting of wireless Internet client information with the service device 30.

Figure 3:
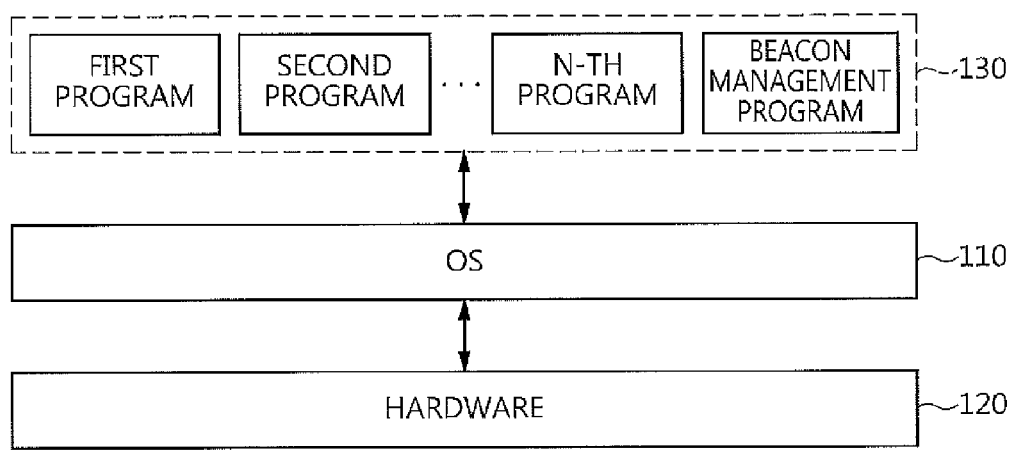
FIG. 3 is a diagram illustrating the platform structure of the terminal according to an embodiment of the present invention.

FIG. 3 is a diagram illustrating the platform structure of a terminal according to an embodiment of the present invention.

Referring to FIG. 3, the platform structure of the terminal 10 may be configured to include hardware 120, an OS 110, and an application 130.

The hardware 120 refers to a physical environment that includes a central processing device (CPU), a short-range wireless communication chip configured to receive a beacon signal, and a communication chip configured to connect to the communication network 40, which constitute the terminal 10.

The OS 110 controls the hardware 120, and is responsible for the overall operation of the terminal 10. The OS 110 may be generally installed by the manufacturer of the terminal 10 or a mobile communication service provider. Furthermore, the OS 110 provides an Application Programming Interface (API) that can control the hardware 120 in order to support the application 130.

The application 130 includes one or more programs operating on the OS 110, and may include a beacon management program. More specifically, the application 130 may control the hardware 120 using the interface API provided by the OS 110. The beacon management program included in the application 130 performs the same operation as the control unit 11 of the terminal 10 described above with reference to FIGS. 1 to 2. Furthermore, the beacon management program included in the application 130 may receive a beacon signal from the beacon device 20 using the interface API provided by the OS 110, and may enhance security in conjunction with the service device 30.

Figure 4:
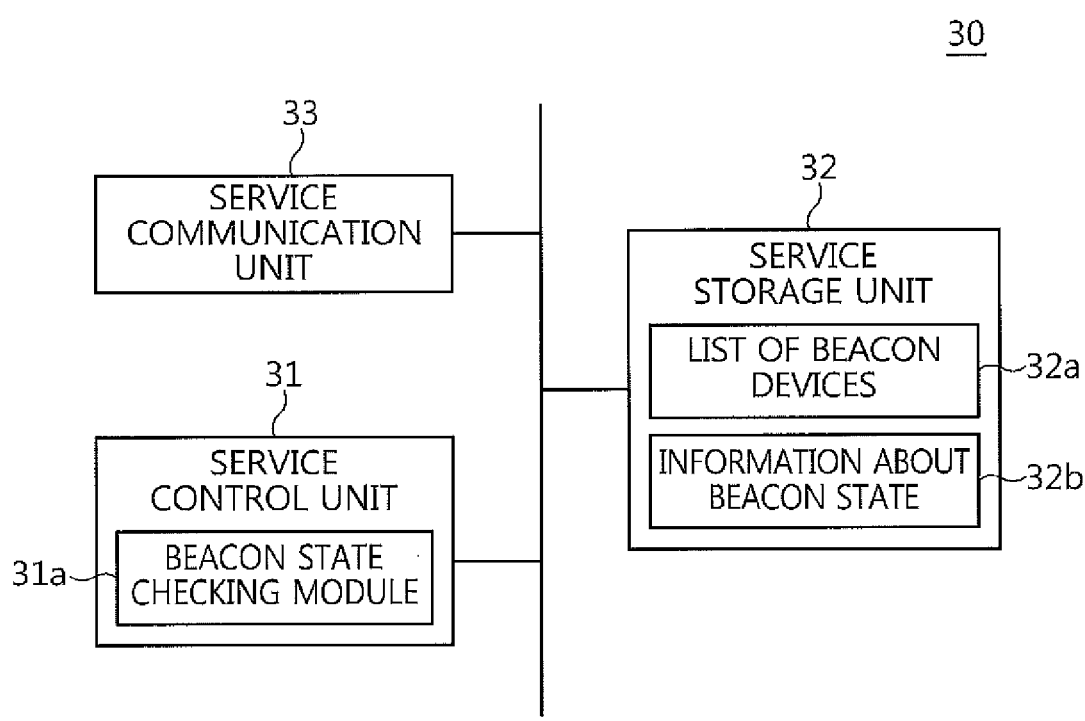
FIG. 4 is a block diagram illustrating the configuration of a service device according to an embodiment of the present invention.

FIG. 4 is a block diagram illustrating the configuration of a service device 30 according to an embodiment of the present invention.

Referring to FIG. 4, the service device 30 according to this embodiment of the present invention includes a service control unit 31, a service storage unit 32, and a service communication unit 33. In this case, the service control unit 31 includes a beacon state checking module 31*a*, and the service storage unit 32 includes a list 32a of beacon devices and information 32b about the beacon state.

The service communication unit 33 communicates with the terminal 10 and the beacon device 20 over the communication network 40, and transmits and receives data applied to the checking of the state of the beacon device 20.

The service storage unit 32 stores all programs and data based on the performance of the functions of the service device 30. In this case, the service storage unit 32 stores the list of beacon devices and the information about the beacon state of the beacon device 20. In this case, the information about the beacon state includes one or more of the normal operation information, communication state information, OS information, upgrade information and power information of the beacon device 20.

The service control unit 31 may be a process device that operates an OS and individual components. In particular, the service control unit 31 according to this embodiment of the present invention receives information about a beacon state from the beacon device 20, and performs an update with the received the information of the beacon state in association with a list of beacon devices.

When the terminal 10 requests the service control unit 31 to check the information about the beacon state of the beacon device 20, the service control unit 31 searches for the information about the beacon state of the corresponding beacon device. Thereafter, the service control unit 31 provides the found information about the beacon state to the terminal 10.

Furthermore, the service device 30 configured as described above may be implemented as one or more servers that operate in a server-based computing-based method or in a cloud method. In particular, data required to enhance security via a beacon may be provided through a cloud computing function that can be permanently stored in a cloud computing device on the Internet. In this case, the term "cloud computing" refers to technology that serves virtualized Information Technology (IT) resources, for example, hardware (a server, a storage, a network, etc.), software (a database, security, a web server, etc), service, data, etc., to a digital terminal, such as a desktop, a tablet computer, a notebook, a netbook and a smartphone in an on-demand manner using internet technology.

Meanwhile, memory mounted on the terminal 10 and the service device 30 stores information within these devices. In an implementation, the memory is medium that is readable by a computer. In an implementation, the memory may be a volatile memory unit. In another implementation, the memory may be a nonvolatile memory unit. In an implementation, a storage device is a medium that is readable by a computer. In various different implementations, the storage device may include, for example, a hard disk device, an optical disk device, or any other mass storage device.

Although exemplary device configurations are described and illustrated in the present specification and the drawings, various implementations of technologies described herein may be implemented as other types of digital electronic circuitry, computer hardware, firmware or software or combinations thereof that include structures disclosed herein and structural equivalents thereto. Each of the various implementations of the subject matter described herein may be implemented as one or more computer program products, i.e. one or more modules related to computer program instructions encoded on a computer-readable medium to control the operation of a device according to an embodiment of the present invention or to be executed by the device. The computer-readable medium may be a machine-readable storage device, a machine-readable storage substrate, a memory device, a material composition affecting machine-readable radio signals, or combinations thereof.

Figure 5:
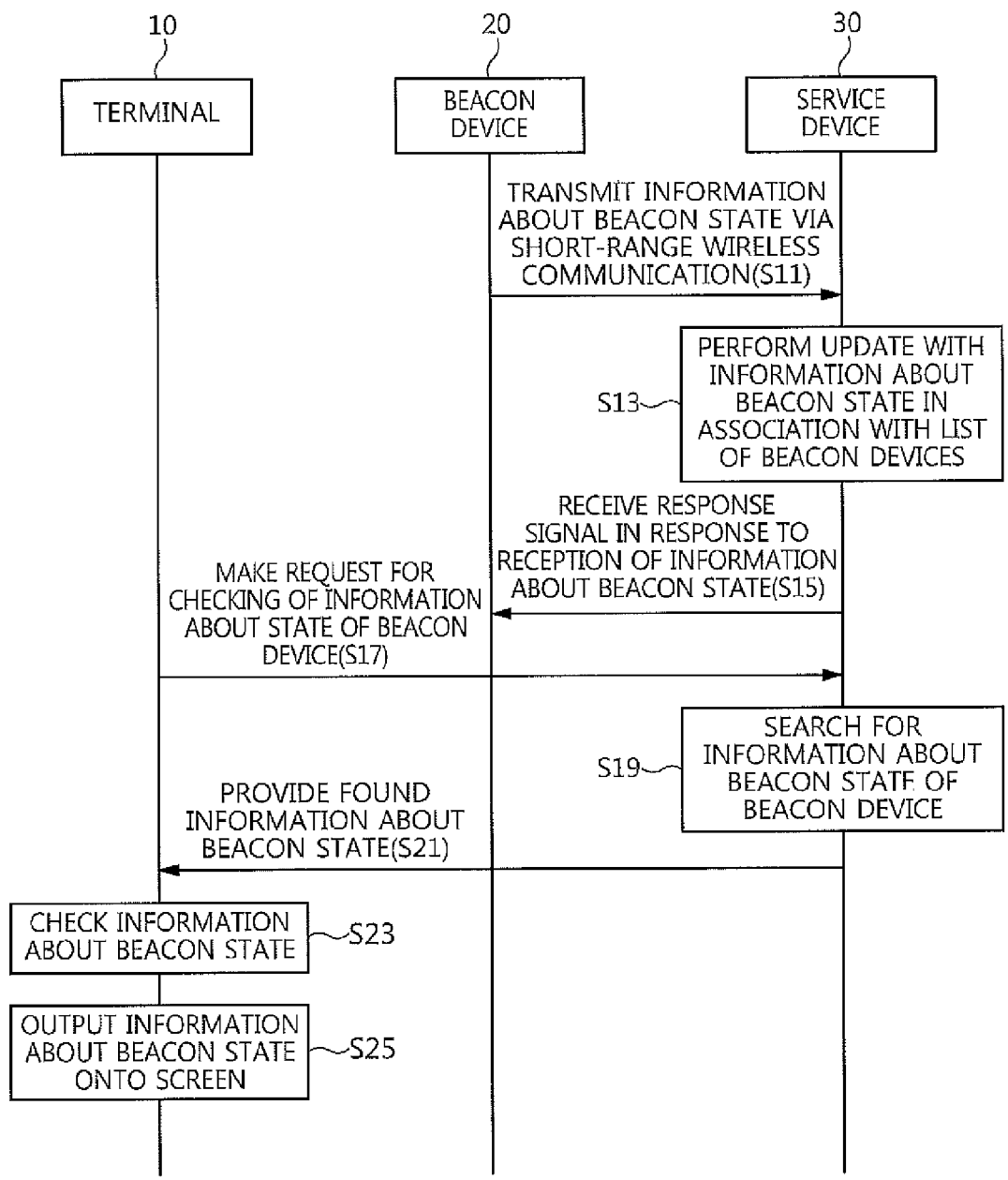
FIG. 5 is a diagram illustrating the flow of data that is used to check the state of a beacon device according to an embodiment of the present invention.

FIG. 5 is a diagram illustrating the flow of data that is used to check the state of the beacon device 20 according to an embodiment of the present invention.

Referring to FIG. 5, the beacon device 20 for checking the beacon state according to this embodiment of the present invention transmits information about the beacon state to the service device 30 via short-range wireless communication at step S11. In this case, the information about the beacon state includes one or more of the normal operation information, communication state information, OS information, upgrade information and power information of the beacon device 20.

At step S13, when the service device 30 receives the information about the beacon state from the beacon device 20, the service device 30 performs an update with the received information about the beacon state in association with a list of beacon devices. Thereafter, at step S15, the service device 30 transmits a response signal to the beacon device 20 in response to the reception of the information about the beacon state.

At step S17, the terminal 10 requests the service device 30 to check the information about the state of the beacon device 20. Thereafter, at step S19, the service device 30 searches for the information about the beacon state of the corresponding beacon device in response to the request from the terminal 10. Thereafter, at step S21, the service device 30 transmits the information about the beacon state to the terminal 10.

At step S23, the terminal 10 receives the information about the beacon state of the beacon device 20 in response to a request for the transmission of the information about the beacon state from the service device 30, and then checks the received information about the beacon state. Thereafter, at step S25, the terminal 10 outputs the checked information about the beacon state onto the screen.

Accordingly, in accordance with this embodiment of the present invention, the operation of the beacon device may be checked in real time by automatically and remotely checking information about a beacon state in order to determine whether the beacon device normally operates, thereby reducing the cost and time required for maintenance and management. Furthermore, the location of the terminal is measured using a BLE beacon signal, so that resources consumed in measuring the location of the terminal can be reduced for the sake of the terminal while a logic required to extract information applied to service can be simplified for the sake of the service device.

Figure 6:
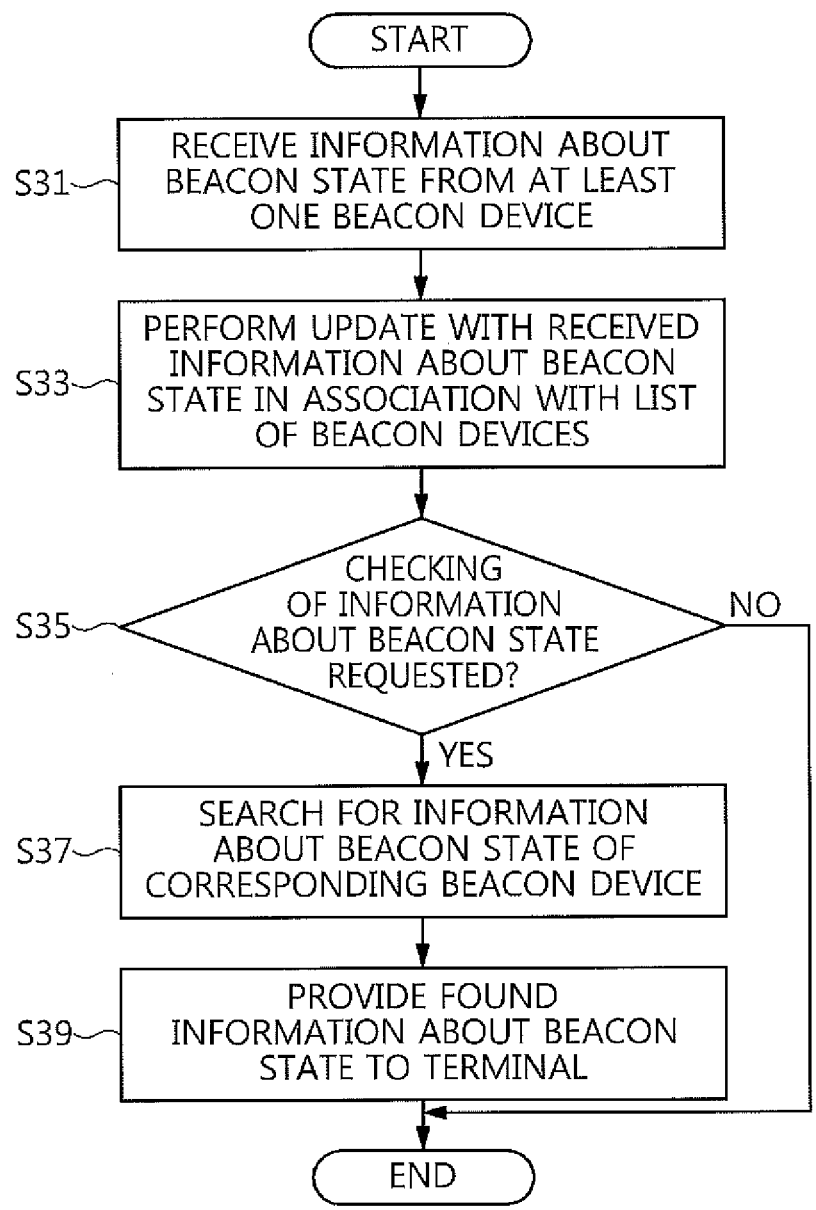
FIG. 6 is a flowchart illustrating a method of operating the service device according to an embodiment of the present invention.

FIG. 6 is a flowchart illustrating a method of operating the service device 30 according to an embodiment of the present invention.

Referring to FIG. 6, at step S31, the service device 30 according to this embodiment of the present invention receives information about a beacon state from the beacon device 20. Thereafter, at step S33, the service device 30 performs an update with the received information about the beacon state in association with a list of beacon devices. In this case, the information about the beacon state includes one or more of the normal operation information, communication state information, OS information, upgrade information and power information of the beacon device 20. Thereafter, the service device 30 transmits a response signal to the beacon device 20 in response to the reception of the information about the beacon state.

At step S35, the service device 30 determines whether the checking of the information about the beacon state has been requested by the terminal 10. If the checking of the information about the beacon state has been requested, the service device 30 searches for the information about the beacon state of a corresponding beacon device at step S37. Thereafter, at step S39, the service device 30 provides the found information about the beacon state to the terminal 10.

Figure 7:
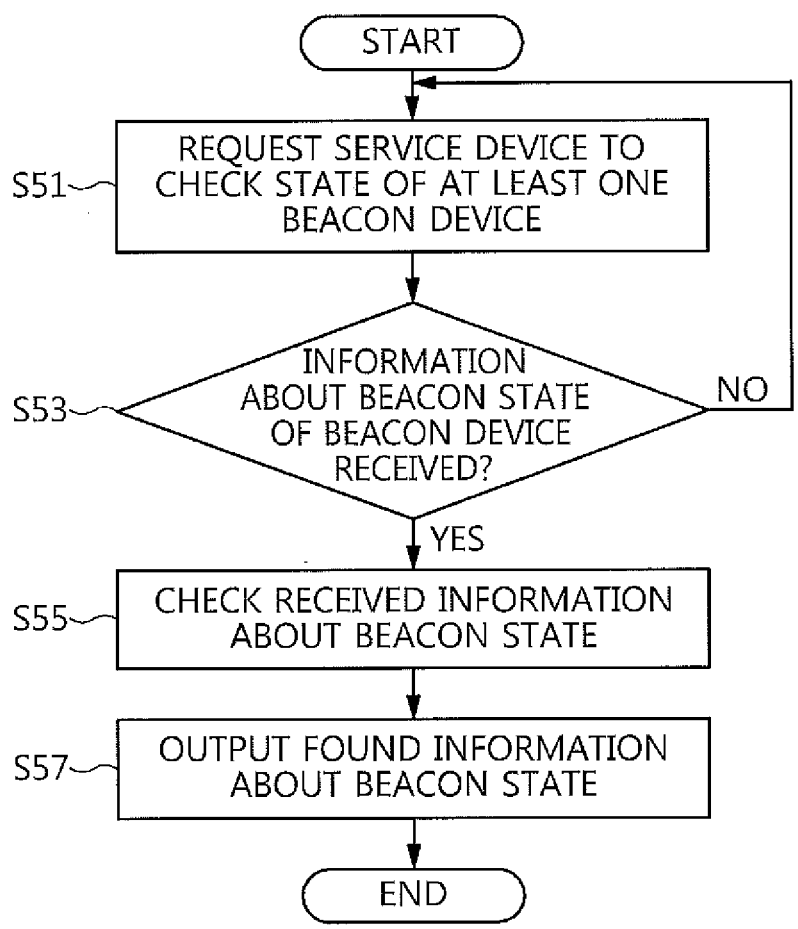
FIG. 7 is a flowchart illustrating a method of operating the terminal according to an embodiment of the present invention.

FIG. 7 is a flowchart illustrating a method of operating the terminal 10 according to an embodiment of the present invention.

Referring to FIG. 7, at step S51, the terminal 10 according to this embodiment of the present invention requests the service device 30 to check information about the state of the beacon device 10. Thereafter, at step S53, the terminal 10 checks whether the information about the beacon state has been received from the service device 30.

If the information about the beacon state has been received, the terminal 10 checks the received information about the beacon state at step S55. In this case, the terminal 10 checks one or more pieces of information about the beacon state from among the normal operation information, communication state information, OS information, upgrade information and power information of the beacon device 20. Thereafter, at step S57, the terminal 10 outputs the found information about the beacon state onto the screen.

Various implementations of the technologies described herein may be implemented as digital electronic circuitry, computer hardware, firmware, software, or combinations thereof. The various implementations may be implemented as computer program products, i.e., information carriers (for example, machine-readable storage devices or computer programs tangibly embodied in radio signals), to perform processing through or control the operation of a data processing apparatus, for example, a programmable processor, a computer, or multiple computers. The computer program, such as the above-described computer program, may be written in any form of programming language, including a compiled or interpreted language, and may be deployed in any form, including a stand-alone program, a module, a component, a subroutine, or any other unit suitable for use in a computing environment. The computer program may be deployed to be executed on one computer or on multiple computers at one site, or may be distributed across multiple sites and interconnected over a communication network.

The methodological steps described herein may be performed by one or more programmable processors that execute a computer program in order to perform functions by operating on-input data and generating output. The methodological steps may also be performed by special purpose logic circuitry, for example, a Field Programmable gate Array (FPGA) or an Application-Specific Integrated Circuit (ASIC), and the devices of the invention may be implemented as this circuitry.

Processors suitable for the execution of a computer program include, for example, both general and special purpose microprocessors and any one or more processors of any type of digital computer. Generally, a processor will receive instructions and data from a read-only memory, a random access memory, or both. The components of a computer may include at least one processor for executing instructions and one or more memory devices for storing instructions and data. Generally, a computer may include one or more mass storage devices for storing data, for example, magnetic, magneto-optical or optical disks, or may be operatively coupled to these mass storage devices in order to receive data from, transfer data to or perform both on these mass storage devices. Information carriers suitable for the embodiment of computer program instructions and data include, by way of example, semiconductor memory devices, for example: magnetic media, such as hard disks, floppy disks or magnetic tapes; optical media, such as CD-ROM and DVD-ROM; magneto-optical media, such as floptical disks; ROM; RAM; and flash memory. The processor and the memory may be supplemented with or incorporated into special purpose logic circuitry.

While the present specification contains many details of particular implementations, these should not be construed as limitations on the scope of the invention or what may be claimed, but, rather, should be construed as descriptions of features specific to particular embodiments of the invention. The particular features that are described in the present specification in the context of separate embodiments may be also implemented in combination in a single embodiment. Conversely, the various features that are described in the context of a single embodiment may be also implemented in multiple separate embodiments or in any suitable sub-combinations. Moreover, although features may be described as operating in a certain combination and the certain combination may be claimed as such, one or more features of the claimed combination may be excluded from the combination in some cases, and the claimed combination may be changed to sub-combinations or variations of sub-combinations.

In the same manner, while operations have been described in a particular order in the drawings, this should not be construed as requiring that the operations should be performed in the described particular order or in a sequential order or all the described operations should be performed in order to achieve desirable results. In some cases, multitasking and parallel processing may be advantageous. Furthermore, the separation of various system components in the embodiments described above should not be construed as requiring such separation in all embodiments, and it should be understood that the described program components and systems may be generally integrated together in single software products or packaged into multi-software products.

The present disclosure relates generally to a method, system and apparatus for checking the state of a beacon device. More particularly, in accordance with the present disclosure, information about a beacon state of the beacon device can be remotely and automatically checked. Accordingly, in order to determinate whether the beacon device normally operates, whether the beacon device normally operates can be checked in real time by automatically and remotely checking information about a beacon state, thereby reducing the cost and time required for maintenance and management. Furthermore, the location of a terminal is measured using a low-power BLE beacon signal, so that resources consumed in measuring the location of the terminal can be reduced for the sake of the terminal while a logic required to extract information applied to service can be simplified for the sake of the service device. Since this present disclosure has sufficient commercial potential or sales potential and can be realistically and explicitly implemented, the present disclosure has industrial availability.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A service device, comprising:
a service communication unit configured to transmit and receive data required for checking of a beacon state of operation of a beacon, with each beacon device including a Wi-Fi module for communicating with the service communication unit and with the service communication unit in communication with, at least, one terminal and the beacon device; and a service control unit in communication with the service communication unit and configured to respond to a request signal from said at least, one terminal to perform control to receive information about the beacon state of the beacon device from the beacon device for maintenance and management of the beacon device, with the service control unit upon receipt of said request signal performing an update with the received information about the beacon state in association with a list of beacon devices, and for checking automatically and remotely of the information about the beacon state of the beacon device, by searching for the information about the beacon state of the beacon device and then providing the found information about the beacon state to the terminal, wherein the information received by the service control unit about the beacon state from the beacon device consists of one or more normal operation information, communication state information, operating system (OS) information, upgrade information, and power information for providing the terminal with a determination based upon said received information in association with a stored list of corresponding beacon devices as to whether the beacon device is operating normally or not, and wherein the service control unit stores the information about the beacon state of the beacon device, and stores the list of corresponding beacon devices for updating the information about the beacon state in association with the stored list of corresponding beacon devices with the service communication unit communicating with the terminal and the beacon device for providing an indication of whether the beacon device is operating normally or not, based upon the updated information.

2. The service device of claim 1, wherein the service communication unit is further configured to receive the information about the beacon state from the beacon device based on short-range wireless communication.

3. The service device of claim 1, wherein the control unit further comprises a service storage unit configured to store the list of beacon devices and the information about the beacon state of the beacon device.

4. A terminal, comprising:
a communication unit configured to transmit and receive data required for checking of a beacon state of a beacon device through communication with, at least, one beacon device and a service device; and
a control unit in communication with the communication unit and configured to control the service device for maintenance and management of the beacon device by having the service device communicate with the beacon device to receive information about the beacon state from the beacon device to check information relating to the beacon operating state of the beacon device and to output the checked information about the beacon state onto a screen,
wherein the information about the beacon state consists of one or more normal operation information, communication state information, operating system (OS) information, upgrade information, and power information for indicating whether the beacon device is operating normally or not, and
wherein the service device receives the information about the beacon state from the beacon device and stores a list of corresponding beacon devices for use in updating the information about the beacon state in association with the stored list of corresponding beacon devices and with the communication unit communicating with the service device and the beacon device so that the terminal can automatically and remotely check if the beacon device is operating normally or not.

5. The terminal of claim 4, wherein the communication unit is further configured to receive a beacon signal using Bluetooth Low Energy (BLE).

6. The terminal of claim 4, wherein the control unit is further configured to:
perform user authentication;
consult a list of one or more allowed beacon devices after the user authentication;
select a specific beacon device from the consulted list;
set broadcasting information for the selected beacon device; and
activate a communication function through setting of wireless Internet client information with the service device.

7. The terminal of claim 4, wherein the control unit is further configured to, in order to check the beacon state of the beacon device, identify at least one of a Universally Unique IDentifier (UUID) of the beacon device, a major adapted to be indicative of a group of beacon devices, and a minor used to identify the beacon device in the group of beacon devices.

8. A non-transitory computer-readable storage medium having stored therein computer-readable program instructions for controlling a service device in communication with a beacon device such that, when the computer-readable program instructions are executed by a computer, the computer performs the method of:
instructing the service device to check information about a beacon state of at least one beacon device in response to a request from a user for maintenance and management of the beacon device;
receiving the information from the service device about the beacon state of the beacon device in response to the request;
checking the received information about the beacon state; and
outputting the checked information about the beacon state onto a screen,
wherein the information about the beacon state consists of one or more normal operation information, communication state information, operating system (OS) information, upgrade information, and power information indicating whether the beacon device operates normally or not, and
wherein the service device stores the information received about the beacon state from the beacon device and stores a list of corresponding beacon devices such that the user can check the state of the beacon device automatically and remotely.

* * * * *